(12) United States Patent
Liu et al.

(10) Patent No.: US 10,179,749 B2
(45) Date of Patent: Jan. 15, 2019

(54) LOW-TEMPERATURE CO-FIRED CERAMIC MATERIAL AND PREPARATION METHOD THEREOF

(71) Applicant: Shenzhen Sunlord Electronics Co., Ltd., Shenzhen, Guangdong (CN)

(72) Inventors: Jian Liu, Guangdong (CN); Min Nie, Guangdong (CN)

(73) Assignee: Shenzhen Sunlord Electronics Co., Ltd., Shenzhen (CN)

( * ) Notice: Subject to any disclaimer, the term of this patent is extended or adjusted under 35 U.S.C. 154(b) by 0 days.

(21) Appl. No.: 15/693,448

(22) Filed: Aug. 31, 2017

(65) Prior Publication Data

US 2018/0057395 A1    Mar. 1, 2018

Related U.S. Application Data

(63) Continuation of application No. PCT/CN2017/092467, filed on Jul. 11, 2017.

(30) Foreign Application Priority Data

Aug. 30, 2016 (CN) .......................... 2016 1 0777620

(51) Int. Cl.
| | | |
|---|---|---|
| *C03C 10/00* | (2006.01) | |
| *C03B 1/00* | (2006.01) | |
| *C03B 19/06* | (2006.01) | |
| *C03C 3/093* | (2006.01) | |
| *C03C 4/16* | (2006.01) | |

(52) U.S. Cl.
CPC ............ *C03C 10/0054* (2013.01); *C03B 1/00* (2013.01); *C03B 19/06* (2013.01); *C03C 3/093* (2013.01); *C03C 4/16* (2013.01); *C03C 10/0009* (2013.01)

(58) Field of Classification Search
CPC . C03C 10/00; C03C 10/0009; C03C 10/0036; C03B 19/06; C03B 19/063
See application file for complete search history.

(56) References Cited

U.S. PATENT DOCUMENTS

| | | | | |
|---|---|---|---|---|
| 4,414,282 A | * | 11/1983 | McCollister | .......... C03C 27/046 428/433 |
| 2013/0272774 A1 | | 10/2013 | Goedeke et al. | |
| 2017/0186510 A1 | * | 6/2017 | Leedecke | ............... H01B 3/087 |

FOREIGN PATENT DOCUMENTS

| | | | |
|---|---|---|---|
| CN | 102173587 A | 9/2011 | |
| CN | 103373813 A | 10/2013 | |
| CN | 103395994 A | 11/2013 | |
| CN | 103553559 A | 2/2014 | |
| CN | 106396414 A | 2/2017 | |
| JP | 3033568 B1 * | 4/2000 | ............... C03C 8/02 |
| WO | 2007013538 A1 | 2/2007 | |

* cited by examiner

*Primary Examiner* — Karl E Group

(57) ABSTRACT

A low-temperature co-fired ceramic material comprises the following components in percentage by weight: 35-50% of CaO, 5-15% of $B_2O_3$, 40-55% of $SiO_2$, 1-5% of nanometer $Al_2O_3$, 1-5% of MgO and 1-5% of nanometer $ZrO_2$. A preparation method comprises the following steps: ball milling and mixing according to the formula, sintering at a high temperature, quenching in deionized water, grinding, performing wet ball-milling, drying and grinding; and finally, granulating to prepare a green body, discharging glue, and sintering, to obtain a low-temperature co-fired ceramic material. According to the low-temperature co-fired ceramic material and the preparation method thereof provided in the present disclosure, the prepared low-temperature co-fired ceramic material has the advantages of low dielectric constant, low loss, good overall performance and the like.

14 Claims, 2 Drawing Sheets

LOW-TEMPERATURE CO-FIRED CERAMIC MATERIAL AND PREPARATION METHOD THEREOF

CROSS REFERENCE TO RELATED APPLICATIONS

This application is a continuation application of PCT/CN2017/092467 filed on Jul. 11, 2017, which claims the benefit of Chinese patent application No. 201610777620.5 filed on Aug. 30, 2016. The contents of the above are all hereby incorporated by reference.

BACKGROUND

Technical Field

The present disclosure relates to a material for an electronic device and a low-temperature co-fired ceramic (LTCC) substrate, and more particularly to a CBS (CaO—$B_2O_3$—$SiO_2$)-based microcrystalline glass-ceramic LTCC material and a preparation method thereof.

Related Art

Low Temperature Co-fired Ceramic (LTCC) technology is an advanced passive integrated and hybrid circuit packaging technology, which has become a preferred way to integrate electronic components in the future. In this context, the low-temperature co-firing of the main medium materials has also become an important development trend. As one of the most promising LTCC materials, CBS is a devitrificable glass with wollastonite ($\beta$-$CaSiO_3$) as a main crystal phase, which has excellent dielectric and thermal properties, and can be sintered with the noble metals Ag and Au at a temperature (<900° C.).

At present, doping is made mainly on the basis of the CBS system in China. However, the research on the doping of this system is only in the initial stage. So far, no CBS-based LTCC material having a low dielectric constant (within 6.0±0.3), a low loss (0.001 or less), and a good overall performance (flexural strength>170 MPa) is developed.

The disclosure in the above background is merely intended to assist in the understanding of the idea and technical solutions of the present application and not necessarily within the prior art of this patent application. Where there is no definite evidence that the foregoing has been disclosed before the filing date of this patent application, the above-mentioned background art should not be used to evaluate the novelty and inventiveness of the present application.

SUMMARY

To solve the above technical problems, the present disclosure provides a low-temperature co-fired ceramic material having a low dielectric constant, a low loss, and a good overall performance, and a preparation method thereof.

To achieve the above object, the following technical solutions are adopted in the present disclosure.

The present disclosure discloses a low-temperature co-fired ceramic material, which comprises the following components in percentage by weight: 35-50% of CaO, 5-15% of $B_2O_3$, 40-55% of $SiO_2$, 1-5% of nanometer $Al_2O_3$, 1-5% of MgO and 1-5% of nanometer $ZrO_2$.

The present disclosure further discloses a method for preparing a low-temperature co-fired ceramic material, which comprises the following steps:

S1: weighing the raw materials $CaCO_3$, $B_2O_3$, $SiO_2$, $Al_2O_3$, MgO, and $ZrO_2$ according to the formula above to obtain chemically pure CaO, $B_2O_3$, $SiO_2$, nanometer $Al_2O_3$, MgO, and nanometer $ZrO_2$; ball milling and mixing the mixed powder where the ball milling medium is zirconia balls, and sieving through a 60-mesh screen after the mixed powder is mixed uniformly;

S2: sintering the sieved mixed powder obtained in Step S1 at a high temperature, and holding for a predetermined period of time, to melt and homogenize the mixed powder completely to obtain a melt;

S3: quenching the melt in deionized water, to obtain a transparent broken glass body;

S4: grinding the broken glass body, to obtain a fine glass body;

S5: performing wet ball milling on the fine glass body, drying, grinding, and sieving through a 120-mesh screen, to obtain a glass powder;

S6: granulating the glass powder with a granulation solution, sieving, and pressing the fine powder into a green body;

S7: discharging glue from the green body; and

S8: sintering the green body after glue discharge, to obtain the low-temperature co-fired ceramic material.

Preferably, the average particle size of the nanometer $Al_2O_3$ is 60-100 nm, and the average particle size of the nanometer $ZrO_2$ is 80-100 nm.

Preferably, the ball milling and mixing step in Step S1 is dry mixing for 4-8 h in a vibrational ball mill, and the weight ratio of the material to the balls in the ball milling and mixing step is 1:(2-4).

Preferably, Step S2 comprises sintering at a high temperature of 1350-1500° C., and the holding time is 1-2.5 h.

Preferably, in the wet ball milling step in Step S5, the weight ratio of material:ball:water is 1:4:1.5, the ball milling time is 6-10 h, and the rotational speed of the ball mill is 200-250 rpm.

Preferably, the drying step in Step S5 takes place at 70-100° C., and the average particle size of the resulting glass powder is 0.5-2.0 μm.

Preferably, Step S6 specifically comprises: adding a 10 wt % solution of polyvinyl alcohol in water to the glass powder, granulating, sieving the powder through a 60-mesh and a 200-mesh screen, and pressing the intermediate powder into a green body, where the press pressure is 220-260 MPa, and the press time is 10-20 s.

Preferably, Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

The present disclosure further discloses a low-temperature co-fired ceramic material, which is a low-temperature co-fired ceramic material prepared according to the method above.

Compared with the prior art, the present disclosure has the following beneficial effects. In the present disclosure, by means of the low-temperature dense sintering achieved by the composition design of low boron formula (where B is introduced as $B_2O_3$) and oxide doping (nanometer $Al_2O_3$, MgO, and nanometer $ZrO_2$) and process control (dry mixing and glass grinding), a low-temperature co-fired ceramic material having a low dielectric constant and a low loss (where the dielectric constant and the loss at multiple frequencies are stable) and a good overall performance and a preparation method thereof are provided. The low-temperature co-fired ceramic material prepared by sintering through the preparation method of the present disclosure comprises a large amount of fine grains ($CaSiO_3$) and a small amount of glass, and is a typical microcrystalline glass-ceramic. The low-temperature co-fired ceramic material has a low dielectric constant ($\varepsilon$=5.9-6.3 @ 10 MHz-100 GHz) and an ultralow loss (tan $\delta$=0.0004-0.0009 @ 10 MHz-100 GHz) (where the dielectric constant and the loss are stable in multiple frequency bands), a flexural strength of 190 MPa or greater, and a good overall performance, and thus can be widely used in filters and substrates.

DETAILED DESCRIPTION

Figure 1:
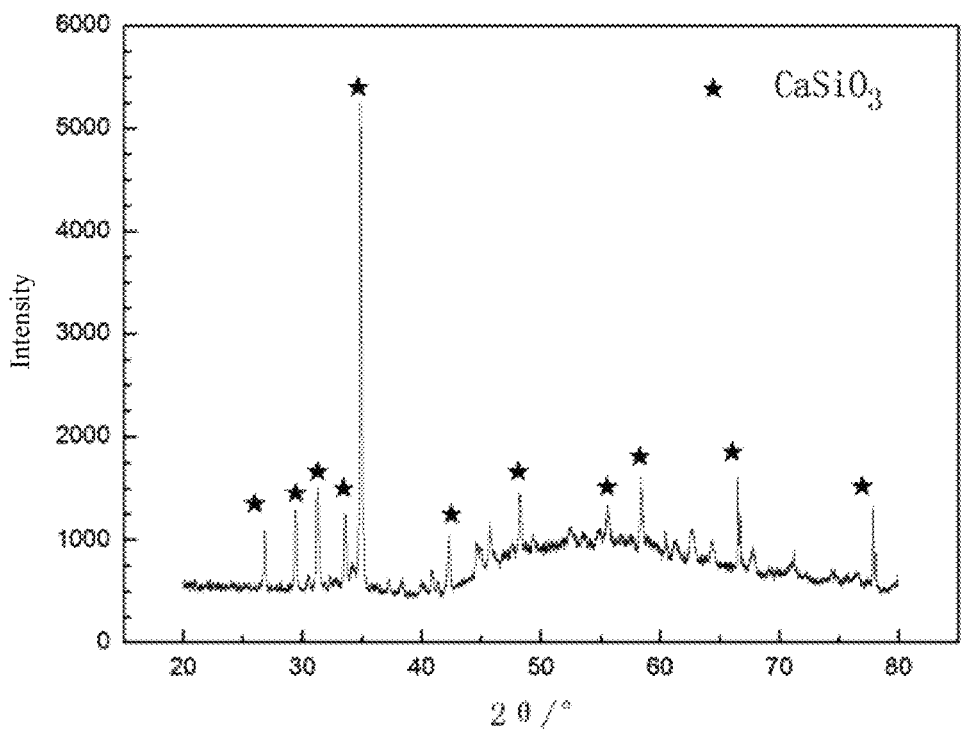
FIG. 1 is an XRD pattern of a sample of a low-temperature co-fired ceramic material prepared in Example 1-1 of the present disclosure.

The present disclosure will now be described in further detail with reference to the accompanying drawings, in conjunction with preferred embodiments.

In an embodiment, a low-temperature co-fired ceramic material comprises the following components in percentage by weight: 35-50% of CaO, 5-15% of $B_2O_3$, 40-55% of $SiO_2$, 1-5% of nanometer $Al_2O_3$, 1-5% of MgO and 1-5% of nanometer $ZrO_2$.

A method for preparing a low-temperature co-fired ceramic material comprises the following steps:

S1: weighing the raw materials $CaCO_3$, $B_2O_3$, $SiO_2$, $Al_2O_3$, MgO, and $ZrO_2$ according to the formula above to obtain chemically pure CaO, $B_2O_3$, $SiO_2$, nanometer $Al_2O_3$, MgO, and nanometer $ZrO_2$, ball milling and mixing the mixed powder where the ball milling medium is zirconia balls, and sieving through a 60-mesh screen after the mixed powder is mixed uniformly;

S2: sintering the sieved mixed powder obtained in Step S1 at a high temperature, and holding for a predetermined period of time, to melt and homogenize the mixed powder completely to obtain a melt;

S3: quenching the melt in deionized water, to obtain a transparent broken glass body;

S4: grinding the broken glass body, to obtain a fine glass body;

S5: performing wet ball milling on the fine glass body, drying, grinding, and sieving through a 120-mesh screen, to obtain a glass powder;

S6: granulating the glass powder with a granulation solution, sieving, and pressing the fine powder into a green body;

S7: discharging glue from the green body; and

S8: sintering the green body after glue discharge, to obtain the low-temperature co-fired ceramic material.

The method for preparing a low-temperature co-fired ceramic material according to the present disclosure is further described with reference to specific examples and comparative examples. The method for preparing a low-temperature co-fired ceramic material of the present disclosure specifically comprises the following steps:

(1) weighing the raw materials $CaCO_3$, $B_2O_3$, $SiO_2$, $Al_2O_3$, MgO, and $ZrO_2$ according to the formula shown in Table 1 to obtain chemically pure CaO, $B_2O_3$, $SiO_2$, nanometer $Al_2O_3$, MgO, and nanometer $ZrO_2$, ball milling and mixing the mixed powder where the ball milling medium is zirconia balls, and sieving through a 60-mesh screen after the mixed powder is mixed uniformly;

(2) pouring the sieved mixed powder obtained in Step (1) into a platinum crucible, and holding for 1-2.5 h at 1350-1500° C., to melt and homogenize the mixed powder completely;

(3) quenching the melt in the crucible in Step (2) in deionized water, to obtain a transparent broken glass body;

(4) grinding the broken glass body by a grinder, to obtain a fine glass body;

(5) performing wet ball milling on the fine glass body obtained in Step (4), drying at 70-100° C., grinding, and sieving through a 120-mesh screen, to obtain a glass powder having an average particle size of 0.5-2.0 µm;

(6) adding a 10 wt % PVA solution to the glass powder obtained in Step (5), granulating, sieving the powder through a 60-mesh and a 200-mesh screen, and pressing the intermediate powder (that is, powder passing through the 60-mesh screen, but not the 200-mesh screen, namely, power having a particle size that is less than of the mesh size of the 60-mesh screen and greater than of the mesh size of the 200-mesh screen) into a green body;

(7) placing the green body obtained in Step (6) in a muffle furnace, raising the temperature to 450° C. at a ramp rate of 1° C./min, and holding for 4 h, to discharge the organics;

(8) placing the green body after glue discharge obtained in Step (7) in a muffle furnace, raising the temperature to 840-880° C. at a ramp rate of 5° C./min, holding for 15-30 min, and then naturally cooling to room temperature with the furnace.

In the method:

in Step (1), the average particle size of the nanometer $Al_2O_3$ is 60-100 nm, and the average particle size of the nanometer $ZrO_2$ is 80-100 nm;

the ball milling and mixing step in Step (1) is dry mixing for 4-8 h in a vibrational ball mill, and the weight ratio of the material to the balls in the ball milling and mixing step is 1:(2-4); and further, the dry mixing is continued for 6 h, and the weight ratio of the material to the balls is 1:4;

in the wet ball milling step in Step (5), the weight ratio of material:ball:water is 1:4:1.5, the ball milling time is 6-10 h, and the rotational speed of the ball mill is 200-250 rpm; and further, the ball milling time is 8 h, and the rotational speed of the ball mill is 200 rpm;

in Step (6), the press pressure is 220-260 MPa, and the press time is 10-20 s; and further the press pressure is 260 MPa and the press time is 20 s; and the green body formed by pressing in Step (6) is a cylindrical green body having a diameter of 14 mm and a thickness of 6-7 mm

TABLE 1

Chemical composition of each example and comparative example

| Example | CaO | B$_2$O$_3$ | SiO$_2$ | Al$_2$O$_3$ | MgO | ZrO$_2$ | Remark |
|---|---|---|---|---|---|---|---|
| Example 1 | 41.2% | 6.3% | 47.5% | 2% | 2% | 1% | Sintered at 850° C., and 870° C. (for 15 mm), and designated as Examples 1-1, and 1-2 respectively |
| Example 2 | 39.2% | 10.3% | 45.5% | 2% | 2% | 1% | Sintered at 850° C. and 870° C. (for 15 mm), and designated as Examples 2-1, and 2-2 respectively |
| Comparative Example 1 | 34 | 18% | 43% | 2% | 2% | 1% | Sintered at 850° C. and 870° C. (for 15 mm), and designated as Comparative Examples 1-1 and 1-2 respectively |
| Comparative Example 2 | 41.3% | 10.8% | 47.9% | 0 | 0 | 0 | Sintered at 850° C. and 870° C. (for 15 mm), and designated as Comparative Examples 2-1 and 2-2 respectively |

The low-temperature co-fired ceramic materials of the examples and comparative examples were prepared by using the above-mentioned parameters. The sintering properties of the low-temperature co-fired ceramic materials of the examples and comparative examples are shown in Table 2 below.

TABLE 2

Sintering properties of the low-temperature co-fired ceramic materials of the examples and comparative examples

| | | | Property | | | | |
|---|---|---|---|---|---|---|---|
| | XY shrinkage | Density | 12 GHz | | T$_f$ | Coefficient of expansion (ppm/° C.) | Flexural strength |
| Example | % | (g/cm$^3$) | ε$_r$ | tan δ | (ppm/° C.) | 25~300° C. | (MPa) |
| Example 1-1 | 14% | 2.65 | 6.02 | 0.00045 | −35 | 2.5 | 192 |
| Example 1-2 | 14% | 2.67 | 6.04 | 0.00048 | −38 | 3.1 | 205 |
| Example 2-1 | 15% | 2.62 | 6.11 | 0.00047 | −41 | 3.3 | 197 |
| Example 2-2 | 15% | 2.68 | 6.15 | 0.00058 | −39 | 3.5 | 204 |
| Comparative Example 1-1 | 14% | 2.56 | 5.59 | 0.00182 | −33 | 3.4 | 150 |
| Comparative Example 1-2 | 14% | 2.61 | 5.64 | 0.00191 | −36 | 3.7 | 156 |
| Comparative Example 2-1 | 9% | 2.29 | 5.11 | 0.00087 | −31 | 1.1 | 79 |
| Comparative Example 2-2 | 10% | 2.40 | 5.22 | 0.00112 | −37 | 1.4 | 87 |

Figure 2:
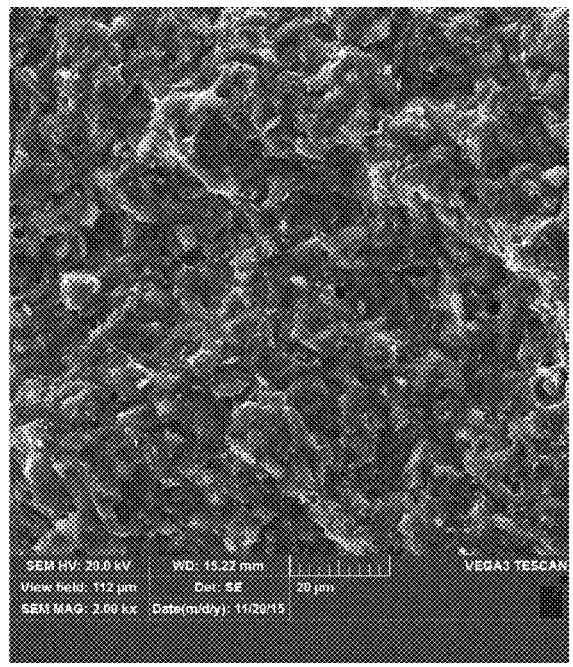
FIG. 2 is a micrograph at the cross section of a sample of a low-temperature co-fired ceramic material prepared in Example 1-1 of the present disclosure.
Figure 3:
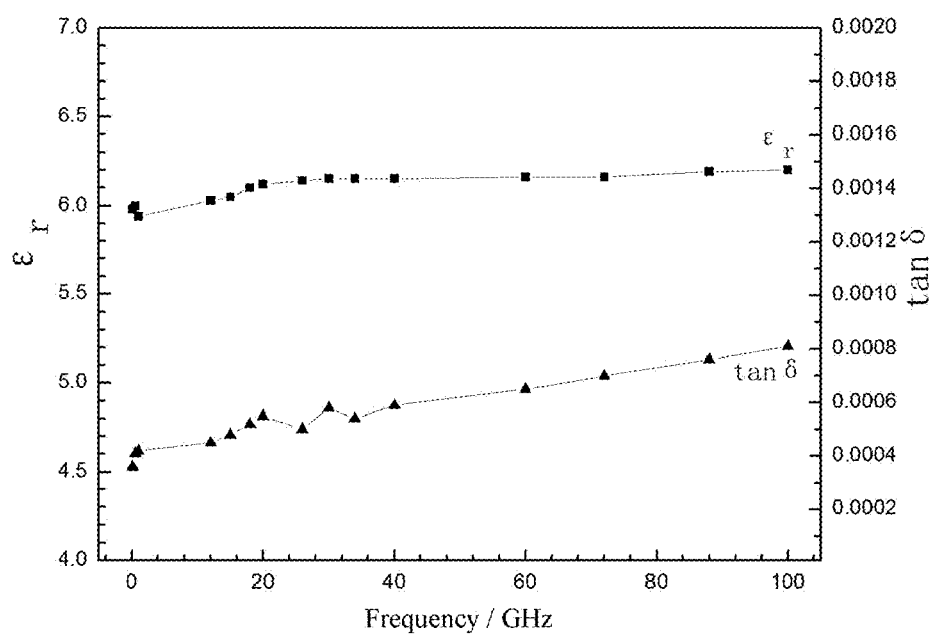
FIG. 3 shows the dielectric constant and loss in multiple frequency bands of a sample of a low-temperature co-fired ceramic material prepared in Example 1-1 of the present disclosure.

It is found through comparison of the low-temperature co-fired ceramic materials prepared in the examples and comparative examples that the loss tan δ in the examples of the present disclosure is significantly smaller than that in the comparative examples and the flexural strength is significantly larger than that in the comparative examples. The CBS microcrystalline glass-ceramic material prepared by densely sintering at a low temperature (at 850 to 870° C. for 15 min) in the above examples has a low dielectric constant (ε=5.9-6.3@ 12 GHz), an ultra-low loss (tan δ=0.0004-0.0009 @ 12 GHz), and a high flexural strength (190 MPa or greater). FIG. 1 is an XRD pattern of a sample of a low-temperature co-fired ceramic material prepared in Example 1-1 of the present disclosure. It can be seen from FIG. 1 that the microcrystalline glass-ceramic prepared with a low-boron formula has a pure CaSiO$_3$ phase. FIG. 2 is a micrograph of a sample of a low-temperature co-fired ceramic material prepared in Example 1-1 of the present disclosure. FIG. 3 shows the dielectric constant and loss in multiple frequency bands of a sample of a low-temperature co-fired ceramic material prepared in Example 1-1 of the present disclosure. It can be seen from FIG. 3 that the low-temperature co-fired ceramic material prepared in Example 1-1 has stable dielectric constant and loss, which are 5.9-6.3, and 0.0004-0.0009@10 MHz-100 GHz respectively.

In the preparation method provided in the preferred examples of the present disclosure, nanometer Al$_2$O$_3$, MgO and nanometer $ZrO_2$ are doped in Ca—B—Si as a base (where if no dopant, sintering at a target temperature cannot be achieved, and the performance cannot be characterized). A low-temperature co-fired ceramic material having excellent physical, mechanical and dielectric properties is prepared by sintering at a low temperature, in which Mg, as an alkaline earth metal oxide, serves to prevent phase separation of the CBS microcrystalline glass-ceramic, and the introduction of the nanometer $Al_2O_3$ and the nanometer $ZrO_2$ makes dry mixing more uniform. Moreover, $Al_2O_3$ also plays a role in preventing phase separation, and $ZrO_2$ serves as a nucleating agent.

The low-temperature co-fired ceramic material prepared by the preparation method provided in the preferred examples of the present disclosure has a low dielectric constant ($\varepsilon$=5.9-6.3 @ 10 MHz-100 GHz), an ultra-low loss (tan $\delta$=0.0004-0.0009@ 10 MHz-100 GHz), a high flexural strength (>190 MPa), and a low sintering temperature (840-880° C.).

Hereinbefore, the present disclosure is described in further detail in connection with specific preferred embodiments; however, the specific implementation of the present disclosure is not limited thereto. It will be apparent to those skilled in the art to which the present disclosure pertains that equivalent replacements or obvious variations serving for the same purpose may be made without departing from the spirit and scope of the present disclosure, which are contemplated in the scope of the present disclosure.

What is claimed is:

1. A method for preparing a low-temperature co-fired ceramic material, comprising the following steps:
   S1: weighing the raw materials $CaCO_3$, $B_2O_3$, $SiO_2$, $Al_2O_3$, MgO, and $ZrO_2$ in percentage by weight: 35-50% of CaO, 5-15% of $B_2O_3$, 40-55% of $SiO_2$, 1-5% of nanometer $Al_2O_3$, 1-5% of MgO and 1-5% of nanometer $ZrO_2$, to obtain chemically pure CaO, $B_2O_3$, $SiO_2$, nanometer $Al_2O_3$, MgO, nanometer $ZrO_2$, ball milling and mixing mixed powder where ball milling medium is zirconia balls, and sieving through a 60-mesh screen after the mixed powder is mixed uniformly;
   S2: sintering the sieved mixed powder obtained in Step S1 at a high temperature, and holding for a predetermined period of time, to melt and homogenize the mixed powder completely to obtain a melt;
   S3: quenching the melt in deionized water, to obtain a transparent broken glass body;
   S4: grinding the broken glass body, to obtain a fine glass body;
   S5: performing wet ball milling on the fine glass body, drying, grinding, and sieving through a 120-mesh screen, to obtain a glass powder;
   S6: granulating the glass powder with a granulation solution, sieving to obtain fine powder, and pressing the fine powder into a green body;
   S7: discharging glue from the green body; and
   S8: sintering the green body after glue discharge, to obtain the low-temperature co-fired ceramic material.

2. The preparation method according to claim 1, wherein average particle size of the nanometer $Al_2O_3$ is 60-100 nm, and the average particle size of the nanometer $ZrO_2$ is 80-100 nm.

3. The preparation method according to claim 1, wherein the ball milling and mixing step in Step S1 is dry mixing for 4-8 h in a vibrational ball mill, and the weight ratio of the material to the balls in the ball milling and mixing step is 1:(2-4).

4. The preparation method according to claim 1, wherein Step S2 comprises sintering at a high temperature of 1350-1500° C., and the holding time is 1-2.5 h.

5. The preparation method according to claim 1, wherein in the wet ball milling step in Step S5, the weight ratio of material:ball:water is 1:4:1.5, the ball milling time is 6-10 h, and the rotational speed of the ball mill is 200-250 rpm.

6. The preparation method according to claim 1, wherein the drying step in Step S5 takes place at 70-100° C., and the average particle size of the resulting glass powder is 0.5-2.0 µm.

7. The preparation method according to claim 1, wherein Step S6 specifically comprises: adding a 10 wt % solution of polyvinyl alcohol in water to the glass powder, granulating, sieving the powder through a 60-mesh and a 200-mesh screen, and pressing the intermediate powder into a green body, where the press pressure is 220-260 MPa, and the press time is 10-20 s.

8. The preparation method according to claim 1, wherein Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

9. The preparation method according to claim 2, wherein Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

10. The preparation method according to claim 3, wherein Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

11. The preparation method according to claim 4, wherein Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

12. The preparation method according to claim 5, wherein Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

13. The preparation method according to claim 6, wherein Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

14. The preparation method according to claim 7, wherein Step S7 specifically comprises: placing the green body in a muffle furnace, raising the temperature to 450-500° C. at a ramp rate of 0.5-1° C./min, and holding for 4-8 h, to discharge the organics; and Step S8 specifically comprises: placing the green body after glue discharge in a muffle furnace, sintering by raising the temperature to 840-880° C. at a ramp rate of 5-8° C./min, holding for 15-30 min, and then naturally cooling to room temperature with the furnace.

* * * * *